(12) United States Patent
Tanida et al.

(10) Patent No.: US 8,178,453 B2
(45) Date of Patent: May 15, 2012

(54) NON-LEAD GLASS

(75) Inventors: Masamichi Tanida, Koriyama (JP); Yuki Yokoyama, Koriyama (JP); Shinji Honda, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/695,187

(22) Filed: Jan. 28, 2010

(65) Prior Publication Data

US 2010/0129726 A1    May 27, 2010

Related U.S. Application Data

(63) Continuation of application No. PCT/JP2008/063703, filed on Jul. 30, 2008.

(30) Foreign Application Priority Data

Aug. 1, 2007 (JP) .................. 2007-201104
Feb. 22, 2008 (JP) .................. 2008-041255

(51) Int. Cl.
*C03C 3/062* (2006.01)
*C03C 8/02* (2006.01)
*C03C 8/24* (2006.01)

(52) U.S. Cl. ............... 501/73; 501/14; 501/15; 501/21; 501/70; 429/486; 429/509

(58) Field of Classification Search ............ 501/14, 501/21, 70, 73, 15; 429/486–489, 507–509
See application file for complete search history.

(56) References Cited

U.S. PATENT DOCUMENTS

| | | | |
|---|---|---|---|
| 4,102,692 A * | 7/1978 | Schartau et al. | 501/38 |
| 5,561,089 A | 10/1996 | Ishizaki et al. | |
| 5,948,537 A | 9/1999 | Onoda et al. | |
| 5,955,388 A * | 9/1999 | Dejneka | 501/3 |
| 6,348,425 B1 * | 2/2002 | Barattini et al. | 501/5 |
| 6,376,400 B1 | 4/2002 | Fujimine et al. | |
| 6,430,966 B1 | 8/2002 | Meinhardt et al. | |
| 6,532,769 B1 | 3/2003 | Meinhardt et al. | |
| 7,399,720 B1 * | 7/2008 | Brow et al. | 501/17 |
| 7,410,921 B2 * | 8/2008 | Pinckney et al. | 501/5 |
| 7,470,640 B2 * | 12/2008 | Badding et al. | 501/5 |
| 2005/0231118 A1 | 10/2005 | Fujimine et al. | |
| 2007/0078047 A1 | 4/2007 | Tanida et al. | |
| 2007/0238601 A1 * | 10/2007 | Pinckney et al. | 501/68 |
| 2008/0090715 A1 * | 4/2008 | Badding et al. | 501/5 |

FOREIGN PATENT DOCUMENTS

| | | |
|---|---|---|
| JP | 07-300340 | 11/1995 |
| JP | 2005-068008 | 3/2005 |
| JP | 2007-145688 | 6/2007 |
| JP | 2007-161569 | 6/2007 |
| WO | 2006-044593 | 4/2006 |

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

To provide a glass containing little $B_2O_3$, whereby when its powder is fired, its thermal expansion curve does not have an inflection point, a non-lead glass is provided containing, as represented by mol % based on the following oxides, from 35 to 41.5% of $SiO_2$, from 8 to 25% of MgO, more than 27 to 35% of CaO, from 0 to 2% of SrO, from 0 to 4% of BaO, from 5 to 15% of ZnO and from 4.5 to 10% of $Al_2O_3$, wherein the total content of these components is at least 97%, and when SrO and BaO are contained, the total content of SrO and BaO is at most 2%; as well as a non-lead glass containing, as represented by mol % based on the following oxides, from 39.5 to 41.5% of $SiO_2$, from 10 to less than 13% of MgO, from 18 to 22% of CaO, more than 12 to 15% of SrO, from 0 to 1% of BaO, from 6 to 11% of ZnO and from 4.5 to 7% of $Al_2O_3$, wherein the total content of these components is at least 97%.

12 Claims, No Drawings

NON-LEAD GLASS

TECHNICAL FIELD

The present invention relates to $SiO_2$—MgO—CaO—ZnO—$Al_2O_3$ type non-lead glass. Particularly, the present invention relates to non-lead glass which is suitable for sealing or joining members selected from the group consisting of metals and ceramics each other, a glass paste, a green sheet and a solid oxide fuel cell (hereinafter referred to as SOFC).

BACKGROUND ART

For producing a composite comprising metal members or ceramic members, sealing glass is widely used as a joining/sealing material for joining/sealing such members to form a composite.

As such sealing glass, glass frits processed in the form of a powder, a glass paste having such glass frits formed into a paste form, or a green sheet (glass sheet) having such glass frits formed into a sheet form may typically be used. That is, in a case where plane parts are to be joined, the glass paste or the green sheet may be used in many cases, and in a case where three-dimensional parts are to be joined, the glass frits may be used in many cases.

In recent years, sealing glass which can be used for sealing members of SOFC and which is operated at a temperature of from 700 to 1,000° C. is demanded. As such sealing glass for SOFC, non-alkali glass comprising, as represented by mass %, from 10 to 30% of $SiO_2$, from 20 to 30% of $B_2O_3$, from 10 to 40% of CaO, from 15 to 40% of MgO, from 0 to 10% of SrO+BaO+ZnO, from 0 to 5% of $Al_2O_3$, from 0 to 5% of $La_2O_3$ and from 0 to 3% of $RO_2$ (R is Zr, Ti or Sn) has been proposed (Patent Document 1).
Patent Document 1: JP-A-2007-161569

DISCLOSURE OF THE INVENTION

Problems to be Solved by the Invention

In Patent Document 1, it is described that when the non-alkali glass powder is fired, the non-alkali glass becomes crystal glass, and since the crystal glass does not have an inflection point on its thermal expansion curve, the crystal glass can be preferably used as a SOFC sealing material.

However, since this non-alkali glass contains at least 20 mass % of $B_2O_3$, the proportion of glass phase remaining in the crystal glass is high, and an inflection point tends to arise on its thermal expansion curve.

It is an object of the present invention to provide sealing glass which is glass containing no $B_2O_3$ or little $B_2O_3$ whereby when its powder is fired, there is no inflection point (flexion) on the thermal expansion curve of the fired product.

Means to Solve the Problems

The present invention provides non-lead glass (hereinafter referred to as "glass 1") comprising, as represented by mol % based on the following oxides, from 35 to 41.5% of $SiO_2$, from 8 to 25% of MgO, more than 27 to 35% of CaO, from 0 to 2% of SrO, from 0 to 4% of BaO, from 5 to 15% of ZnO and from 4.5 to 10% of $Al_2O_3$, wherein the total content of these components is at least 97%, and when SrO and BaO are contained, the total content of SrO and BaO is at most 2%.

Further, the present invention provides the non-lead glass according to the glass 1, wherein $SiO_2$ is at least 38%, MgO is from 13 to 17%, CaO is from 28 to 33%, BaO is at most 2.2%, ZnO is at most 12%, and $Al_2O_3$ is at most 7%.

Further, the present invention provides non-lead glass comprising, as represented by mol % based on the following oxides, from 38 to 41.5% of $SiO_2$, from 8 to 25% of MgO, more than 28 to 35% of CaO, from 0 to 1% of SrO, from 0 to 1% of BaO, from 5 to 15% of ZnO and from 4.5 to 10% of $Al_2O_3$, wherein the total content of these components is at least 98%.

Further, the present invention provides non-lead glass (hereinafter referred to as "glass 2") comprising, as represented by mol % based on the following oxides, from 35 to 41.5% of $SiO_2$, from 8 to 25% of MgO, from 10 to 27% of CaO, from 0 to 12% of SrO, from 0 to 4% of BaO, from 5 to 15% of ZnO and from 4.5 to 10% of $Al_2O_3$, wherein the total content of these components is at least 97%.

Further, the present invention provides the non-lead glass according to the glass 2, wherein $SiO_2$ is at least 38%, MgO is at least 13%, CaO is at least 13%, BaO is at most 2.5%, ZnO is from 6 to 11%, and $Al_2O_3$ is at most 7%.

Further, the present invention provides non-lead glass comprising, as represented by mol % based on the following oxides, from 38 to 41.5% of $SiO_2$, from 8 to 25% of MgO, from 10 to 26% of CaO, at most 12% of SrO, from 0 to 4% of BaO, from 5 to 15% of ZnO and from 4.5 to 10% of $Al_2O_3$, wherein the total content of these components is at least 98%.

Further, the present invention provides non-lead glass (hereinafter referred to as "glass 3") comprising, as represented by mol % based on the following oxides, from 39.5 to 41.5% of $SiO_2$, from 10 to less than 13% of MgO, from 18 to 22% of CaO, more than 12 to 15% of SrO, from 0 to 1% of BaO, from 6 to 11% of ZnO and from 4.5 to 7% of $Al_2O_3$, wherein the total content of these components is at least 97%.

Further, the present invention provides sealing glass made of the non-lead glass 1, 2 or 3, which typically has a sealing temperature of at least 900° C.

Further, the present invention provides a glass paste, which contains a powder of the non-lead glass 1, 2 or 3.

Further, the present invention provides a green sheet, which contains a powder of the non-lead glass 1, 2 or 3.

Further, the present invention provides a process for producing a solid oxide fuel cell (SOFC), which comprises a step of sealing members made of a ceramics or metal each other by means of a powder of the non-lead glass 1, 2 or 3.

Further, the present invention provides a solid oxide fuel cell having at least one sealed part at which members made of a ceramics or metal are sealed each other, wherein at least one sealed part is sealed with a fired product formed by firing the non-lead glass 1, 2 or 3.

Further, "members made of a ceramics or metal are sealed each other" includes a case where a member made of a ceramics and a member made of a metal are sealed each other. Further, the present invention provides the SOFC wherein CaO—MgO—$SiO_2$ crystal precipitates in a fired product.

The present inventors have considered that it is difficult to solve the above problems by only evaluating whether a thermal expansion curve has an inflection point or not, and the present inventors have arrived at the present invention by employing the following index of the flexion degree and the after-mentioned differential peak.

Flexion degree: straight lines (two straight lines) are drawn so as to fit the straight line parts present in the respective 50° C. regions on the right and left sides of the bent portion of the thermal expansion curve (horizontal axis: temperature, vertical axis: degree of elongation), and the flexion degree is an interval in the up direction and the down direction at the bent portion, of the two straight lines.

Effects of the Invention

According to the present invention, it is possible to obtain non-lead glass containing no more than 3 mol % of $B_2O_3$, whereby when its powder is fired, there is no inflection point on its thermal expansion curve, or an inflection point does not exist substantially.

BEST MODE FOR CARRYING OUT THE INVENTION

The non-lead glass of the present invention (hereinafter referred to as the glass of the present invention) is usually used in the form of a powder.

The glass of the present invention or its powder is typically used for sealing, and in such a case, the glass of the present invention or its powder is fired at from 900 to 1,100° C., typically from 900 to 1,000° C., to obtain a fired product. Such a fired product is crystallized glass.

Typical crystal which precipitates in the crystallized glass is high expansion crystal such as $CaO$—$MgO$—$SiO_2$ crystal such as melilite, $MgO$—$SiO_2$ crystal such as forsterite, $CaO$—$SiO_2$ crystal, $SiO_2$—$MgO$—$CaO$—$Al_2O_3$ crystal or $CaO$—$SiO_2$—$Al_2O_3$ crystal. Among them, the $CaO$—$MgO$—$SiO_2$ crystal such as melilite is preferred, since in the case of glass in which the $CaO$—$MgO$—$SiO_2$ crystal precipitates at the time of firing, deformation of the crystal phase is little at the time of firing, and the strength of the bulk body (crystallized glass) after crystallization tends to be stabilized.

Now, the present invention will be described with reference to a case where the glass of the present invention is used for sealing constituting members of SOFC, etc., however, the application of the glass of the present invention is not restricted thereto. That is, the glass of the present invention is preferably used in applications where it is desired that when its powder is fired, the thermal expansion curve of the fired product obtained does not have an inflection point or does not substantially have an inflection point.

The glass of the present invention preferably has a softening point (Ts) of at least 800° C. If Ts is less than 800° C., a reaction with members to be sealed may be large. Ts is more preferably higher than 800° C., typically at least 805° C. Further, Ts is preferably at most 850° C. If Ts exceeds 850° C., the fluidity of glass may be low.

The crystallization temperature (Tc) of the glass of the present invention is typically from 900 to 1,000° C.

Here, Tc is measured as follows. That is, by differential thermal analysis, the temperature of an exothermic peak observed at the first on the higher temperature side than Ts is measured and used as Tc.

(Tc-Ts) is preferably at least 100° C. If (Tc-Ts) is less than 100° C., the fluidity at the time of firing is insufficient, and voids are formed between the fired product (crystallized glass) and an object to be sealed, and the desired sealing may not be carried out. (Tc-Ts) is more preferably at least 120° C.

The average linear expansion coefficient ($a$) at 50 to 1,000° C. of a fired product (crystallized glass) obtained by firing a powder of the glass of the present invention by maintaining 950° C. for 1 hour is preferably from $90 \times 10^{-7}$ to $110 \times 10^{-7}$/° C. If the average linear thermal expansion coefficient is outside this range, matching of the thermal expansion coefficient to an object to be sealed may be insufficient.

When $\alpha$ of the fired product is measured, a thermal expansion curve of its fired product at from 50 to 1,000° C. is measured, and its thermal expansion curve is preferably a straight line. Here, "thermal expansion curve is a straight line" means that the flexion degree is 0.

The glass 1 is glass such that the above-mentioned CaO-containing composite oxide tends to precipitate as a main crystal, and the crystallization rate of this CaO-containing composite oxide is relatively high. As a result, in a case where such glass or its powder is contacted to a member such as a metal member or ceramics member and fired, time in which such a member contacts to not crystallized glass is short, and it is expected to suppress a reaction of such a member with glass. Therefore, the glass 1 is preferably used in a case where it is desired to suppress a reaction with a member at the time of firing.

The glass 2 is glass such that as compared to the glass 1, a CaO-containing composite oxide tends not to precipitate at the time of firing, and the glass 2 is preferably used in a case where it is desired to improve the fluidity at the time of firing.

The glass 3 is glass such that crystal having a small thermal expansion coefficient such as $SrO$—$Al_2O_3$—$SiO_2$ crystal, for example slawsonite, tends to precipitate, and the glass 3 is preferably used in a case where it is desired to lower $\alpha$.

Next, the composition of the glass of the present invention will be explained by representing "mol %" simply as "%".

$SiO_2$ is a component for forming a network of glass and essential for improving stability of glass and preventing crystallization at the time of producing glass. Further, in a case where $SiO_2$-containing high expansion crystal such as $CaO$—$MgO$—$SiO_2$ crystal such as melilite, or $MgO$—$SiO_2$ crystal such as forsterite forms at the time of firing glass powder, $SiO_2$ is a component of such crystal. If the content of $SiO_2$ exceeds 41.5%, problems arise such that Ts becomes high. The content of $SiO_2$ is preferably at most 41.2%, typically at most 41%. If the content of $SiO_2$ is less than 35%, the stability of glass deteriorates at the time of producing glass, and crystals tend to precipitate in glass. In the case of glass powder in which such crystals precipitate, the crystallization starts early at the time of firing, the fluidity deteriorates, and the desired sealing thereby cannot be carried out. The content of $SiO_2$ is preferably at least 38%, typically at least 38.5%, and in the glass 3, the content of $SiO_2$ is at least 39.5%.

MgO is a component of MgO-containing high expansion crystal such as $MgO$—$SiO_2$ crystal or $CaO$—$MgO$—$SiO_2$ crystal and essential. If the content of MgO is less than 8% in the glass 1 and glass 2, or if the content of MgO is less than 10% in the glass 3, crystals tend not to precipitate at the time of firing, the crystallinity of a fired product cannot be high, the proportion of the glass phase remaining in the crystal phase becomes high, and the heat resistance thereby deteriorates. The content of MgO is at least 13% in the glass 1 or 2. If the content of MgO exceeds 25% in the glass 1 or 2, the stability of glass at the time of producing glass tends to be low. The content of MgO is preferably at most 24%. The content of MgO is more preferably at most 17% in the glass 1. If the content of MgO is at least 13% in the glass 3, crystals tend not to precipitate at the time of firing, the crystallinity of a fired product cannot be high, the proportion of the glass phase remaining in the crystal phase becomes high, and the heat resistance thereby tends to be poor.

CaO is a component of CaO-containing high expansion crystal such as $CaO$—$SiO_2$ crystal or $CaO$—$MgO$—$SiO_2$ crystal and essential.

If the content of CaO is at most 27% in the glass 1, the start of crystallization at the time of firing becomes late, and a reactivity with a member to be sealed becomes large. The content of CaO is typically at least 28%. If the content of CaO exceeds 35%, the start of crystallization at time of firing becomes too early, the fluidity deteriorates, and the desired sealing may not be carried out. The content of CaO is preferably at most 33%.

If the content of CaO is less than 10% in the glass 2, the stability of glass at the time of producing glass tends to be low. The content of CaO is preferably at least 13%. If the content of CaO exceeds 17%, the fluidity at the time of firing deteriorates.

If the content of CaO is less than 18% or exceeds 22% in the glass 3, the start of crystallization at the time of firing becomes too early, and the fluidity deteriorates. The content of CaO is typically at least 19% and at most 21% in the glass 3.

In the glass 1, the molar ratio of CaO to MgO (CaO/MgO) is preferably from 1.8 to 2.2. If CaO/MgO is less than 1.8 or exceeds 2.2, the start of crystallization at the time of firing becomes too early, the fluidity deteriorates, and the desired sealing may not be carried out. CaO/MgO is typically from 1.9 to 2.1 in the glass 1.

In the glass 2, the molar ratio of CaO to MgO (CaO/MgO) is preferably from 0.7 to 1.7. If CaO/MgO is less than 0.7 or exceeds 2.2 in the glass 2, the start of crystallization at the time of firing becomes too early, the fluidity deteriorates, and the desired sealing thereby may not be carried out. The CaO/MgO in the glass 2 is typically at least 0.8 or at most 1.6 in the glass 2.

In a case where it is desired to improve the fluidity of the glass 2, MgO is preferably from 21 to 24%, while CaO is preferably from 21 to 24%, and MgO is more preferably from 22 to 23%, while CaO is more preferably from 22 to 23%.

SrO is a component for controlling thermal expansion or fluidity, etc. SrO is not essential in the glass 1 but may be contained up to 2% in some cases. If SrO exceeds 2%, the start of crystallization at the time of firing becomes too early, and the fluidity deteriorates. In a case where SrO is contained, the content of SrO is typically at least 0.5%.

SrO is not essential in the glass 2 but may be contained up to 12% in some cases. If SrO exceeds 12%, the thermal expansion coefficient becomes small, the start of crystallization at the time of firing becomes too early, and the fluidity deteriorates. SrO is typically at most 11%. In a case where SrO is contained, the content of SrO is typically at least 1%.

If SrO is at most 12% in the glass 3, crystals tend not to precipitate at the time of firing, the proportion of the glass phase remaining in the crystal phase becomes high, and the heat resistance thereby deteriorates. SrO is typically at least 14% in the glass 3. If the SrO exceeds 15%, the thermal expansion coefficient becomes small.

If both SrO and BaO are contained in the glass 1, and the total content of SrO and BrO exceeds 2%, the start of crystallization at the time of firing becomes too early, and the fluidity deteriorates.

The total content of MgO, CaO and SrO in the glass 2 is preferably at least 38%, typically at least 40%.

BaO is a component for controlling crystallinity or the fluidity, improving an adhesion to a metal member, etc.

BaO is not essential in the glass 1 but may be contained up to 4% in some cases. If BaO exceeds 4%, the start of crystallization at the time of firing becomes too early, and the fluidity deteriorates. The content of BaO is preferably at most 2.2% in the glass 1. In a case where BaO is contained, the content of BaO is typically at least 0.5%.

BaO is not essential in the glass 2 but may be contained up to 4% in some cases. If the content of BaO exceeds 4% in the glass 2, crystals tend not to precipitate at the time of firing, and the proportion of the glass phase remaining in the crystal phase becomes high, and the heat resistance thereby deteriorates. The content of BaO is preferably at most 2.5%. In a case where BaO is contained, the content of BaO is typically at least 0.5%.

In the glass 3, BaO is not essential but may be contained up to 1% in some cases. If BaO exceeds 1%, crystals tend not to precipitate at the time of firing, the proportion of the glass phase remaining in the crystal phase becomes high, and the heat resistance thereby deteriorates. The content of BaO is preferably at most 0.5%. In a case where BaO is contained, the content of BaO is typically at least 0.1%.

ZnO is a component for lowering Ts, controlling crystallinity, improving an adhesion to a metal member, etc and essential. If the content of ZnO is less than 5% in the glass 1 or glass 2, or the content of ZnO is less than 6% in the glass 3, glass becomes unstable. The content of ZnO is preferably at least 6% in the glass 1 or glass 2, and the content of ZnO is typically at least 7% in the glass 3. If the content of ZnO exceeds 15% in the glass 1 or glass 2, or the content of ZnO exceeds 11% in the glass 3, crystals having a small thermal expansion coefficient tend to precipitate at the time of firing, and glass becomes low thermal expansion. The content of ZnO is preferably at most 12%, typically at most 11% in the glass 1 or 2, and the content of ZnO is typically at most 9% in the glass 3.

In the glass 2, the total content of BaO and ZnO is preferably at most 15%. If the total content of BaO and ZnO exceeds 15% in the glass 2, the crystallinity of a fired product becomes low. The total content of BaO and ZnO is typically at most 12%.

$Al_2O_3$ is a component for improving the stability at the time of producing glass, controlling Tc or maintaining an adhesion to a metal and essential. If the content of $Al_2O_3$ exceeds 10% in the glass 1 or glass 2 or exceeds 7% in the glass 3, crystals having a small thermal expansion coefficient tend to precipitate at the time of firing, and a becomes low. The content of $Al_2O_3$ is preferably at most 9%, typically at most 7% in the glass 1 or 2, and the content of $Al_2O_3$ is at most 6% in the glass 3. If the content of $Al_2O_3$ is less than 4.5%, vitrification becomes difficult. The content of $Al_2O_3$ is typically at least 4.9%.

The glass of the present invention typically comprises the above components, however, so far as the object of the present invention is not impaired, other components may be contained. In such a case, the total content of such other components is at most 3%, typically at most 1.5%.

Accordingly, for example, $B_2O_3$ is not contained, or if contained, the content of $B_2O_3$ is at most 3%. If the content of $B_2O_3$ exceeds 3%, the proportion of the glass phase remaining in crystallized glass is high, an inflection point arises on the thermal expansion curve, and in a temperature region corresponding to the inflection point, a strong shearing force or deflection is likely to form at a boundary surface between an object to be sealed at a sealing portion and crystallized glass, which causes exfoliation. The content of $B_2O_3$ is preferably at most 2.5%, particularly preferably 2%, typically at most 1%. Further, $B_2O_3$ is a component which may be contained in a case where it is desired to improve the fluidity at the time of firing.

Now, components other than $B_2O_3$ and the above components will be exemplified.

If $ZrO_2$ is contained up to 1% for example, the object of the present invention may not be impaired in some cases.

If $La_2O_3$ is contained up to 1.2% for example, the object of the present invention may not be impaired in some cases. When 0.8 to 1.2% of BaO is contained, and 0.8 to 1.2% of $La_2O_3$ is contained, the fluidity at the time of firing may be preferably improved in some cases. The content of $La_2O_3$ is typically at most 1%.

Further, an alkali metal oxide is not contained, or if contained, the total content of the alkali metal oxide is preferably at most 1%. If the content of the alkali metal oxide exceeds 1%, in a case where the glass of the present invention is used for sealing constituting members of SOFC, since alkali metal ions are likely to heat-diffuse, they diffuse into ceramics members or metal members, and properties of SOFC may be substantially deteriorated.

$TiO_2$ is a component which impairs the fluidity, and $TiO_2$ is thereby preferably not contained.

Further, the glass of the present invention is non-lead glass and does not contain PbO.

The glass paste of the present invention is produced by mixing a powder of the glass of the present invention and an organic vehicle, etc. for imparting a printing property or the like. Further, the organic vehicle is prepared by dissolving a binder such as ethylcellulose in an organic solvent such as an α-terpineol.

For example, the glass paste of the present invention is applied on a portion to be sealed such as a surface of ceramic members or metal members which constitute a fuel manifold and cell of SOFC and fired so as to be crystallized glass (fired product) to seal the desired constituting members.

Further, such constituting members may be sealed with the green sheet of the present invention.

Further, the method for producing SOFC by sealing ceramics members or metal members or SOFC by means of the glass paste or the green sheet of the present invention is the production method of SOFC of the present invention. SOFC thus produced is SOFC of the present invention.

Examples

Starting materials were prepared and mixed so as to have compositions as shown in columns for from $SiO_2$ to $B_2O_3$ or to $ZrO_2$ in Tables 1 to 5 by mol %. The mixture was melted at from 1,450 to 1,550° C. by means of a platinum crucible in an electric furnace for 1 hour and formed into a thin plate glass, followed by pulverizing by a ball mill and removing coarse particles by a sieve having 150 mesh to obtain a glass powder. Examples 1 to 30 are Working Examples, and Examples 31 to 44 are Comparative Examples.

Tg (unit: ° C.), Ts (unit: ° C.) and Tc (unit: ° C.) of each glass were measured by using a differential thermal analysis apparatus.

Further, each glass powder was molded and fired at 950° C. for one hour to obtain a fired product, the fired product was processed into a column shape having a diameter of 5±0.5 mm and a length of 2±0.05 cm, and a thermal expansion curve (horizontal axis: temperature, vertical axis: length of fired product) at 50 to 1,000° C. was measured by a thermal expansion meter Thermoplus 2 system TMA8310, manufactured by Rigaku Corporation under a condition of a temperature rising rate of 10° C./min, and an average thermal expansion coefficient α (unit: $10^{-7}/°C.$) was calculated.

A flexion degree (unit: ppm) calculated from this thermal expansion curve was also shown in Tables.

Further, a differential curve (horizontal axis: temperature, vertical axis: a change in length of a fired product per unit temperature) of this thermal expansion curve was prepared.

In a case where a thermal expansion curve has an inflection point, the differential curve has an up peak or down peak at a temperature corresponding to the inflection point, and the differential curve usually has an up peak.

In a case where the differential curve has an up peak or down peak, the highest up peak or the lowest down peak is shown in the column for the differential peak in Tables with a unit of μm/s which represents a unit of temperature rising time as second. Accordingly, for example, the differential peak of 1 μm/s here corresponds to 6 μm/° C. of the highest up peak or the lowest down peak. Further, when the up peak or down peak of the differential curve was read, spike form up peaks or spike form down peaks formed by irregular movement of the fired product during measurements were excluded.

The differential peak of the differential curve is preferably at most 0.01 μm/s. In such a case, it is considered that the thermal expansion curve of the fired product of a powder does not substantially have an inflection point.

Further, in Tables, "-" means "not measured", and a value with "*" is a value estimated from the composition.

The fluidity of each glass powder was evaluated as follows. That is, 1.5 g of a glass powder was press-molded to prepare a sample (flow button) having a diameter of 1 cm, the sample was fluidized by heating to 950° C. to evaluate the fluidity. In a case where the corner angle of the heated sample is at least 120°, the fluidity is excellent, which is represented by ○ in Tables. When the corner angle is 90°, namely, the sample is not fluidized at all, it is represented by X. When the corner angle is higher than 90° and less than 120°, the value of the angle is shown by the unit of degree.

In a case where the above angle is 90° when the sample is heated to 950°, it is considered that the fluidity will not be good under other temperature-rising conditions. However, in a case where the above angle is higher than 90° and less than 120°, it is considered possible that the fluidity will be good, if the temperature-rising condition is changed.

Further, melilite and forsterite precipitated in fired products obtained by firing glass powders of Examples 1, 2 and 7.

TABLE 1

| | Examples | | | | | | | | |
|---|---|---|---|---|---|---|---|---|---|
| | 1 | 2 | 3 | 4 | 5 | 6 | 7 | 8 | 9 |
| $SiO_2$ | 40.5 | 40.5 | 40.5 | 40.5 | 40.5 | 40.5 | 40.0 | 40.5 | 40.5 |
| MgO | 15.3 | 15.6 | 16.0 | 21.5 | 22.0 | 16.0 | 15.0 | 15.0 | 16.0 |
| CaO | 30.6 | 31.2 | 32.0 | 15.0 | 20.0 | 26.0 | 30.0 | 30.0 | 32.0 |
| SrO | 0 | 0 | 0 | 10.0 | 4.5 | 4.5 | 0 | 0.9 | 0 |
| BaO | 0.9 | 0 | 0 | 0 | 0 | 0 | 0 | 0.9 | 0 |
| ZnO | 7.8 | 7.8 | 6.0 | 8.0 | 8.0 | 8.0 | 10.0 | 7.8 | 6.5 |
| $Al_2O_3$ | 4.9 | 4.9 | 5.0 | 5.0 | 5.0 | 5.0 | 5.0 | 4.9 | 5.0 |
| $B_2O_3$ | 0 | 0 | 0.5 | 0 | 0 | 0 | 0 | 0 | 0 |
| Tg | 715 | 712 | 716 | 708 | 710 | 713 | 699 | 714 | 719 |
| Ts | 831 | 834 | 834 | 830 | 830 | 834 | 821 | 835 | 838 |
| Tc | 970 | 963 | 940 | 968 | 959 | 987 | 956 | 962 | 965 |
| Tc − Ts | 139 | 129 | 107 | 138 | 129 | 153 | 136 | 127 | 127 |
| α | 102 | 102 | 103 | 91 | 94 | 93 | 96 | 94 | 99 |

TABLE 1-continued

| | Examples | | | | | | | | |
|---|---|---|---|---|---|---|---|---|---|
| | 1 | 2 | 3 | 4 | 5 | 6 | 7 | 8 | 9 |
| Flexion degree | 0 | 0 | 0 | 0 | 0 | 0 | 0 | 0 | 0 |
| Differential peak | 0.003 | 0.007 | 0.006 | 0.002 | 0.005 | 0.002 | 0.002 | 0.007 | 0.003 |
| Fluidity | ○ | ○ | ○ | ○ | ○ | ○ | ○ | 115 | 110 |

TABLE 2

| | Examples | | | | | | | | |
|---|---|---|---|---|---|---|---|---|---|
| | 10 | 11 | 12 | 13 | 14 | 15 | 16 | 17 | 18 |
| $SiO_2$ | 40.0 | 40.5 | 39.0 | 40.5 | 40.5 | 40.5 | 40.5 | 40.5 | 40.0 |
| MgO | 16.0 | 14.5 | 15.0 | 24.0 | 11.5 | 16.5 | 16.0 | 16.0 | 15.2 |
| CaO | 31.0 | 28.0 | 31.0 | 18.0 | 20.0 | 20.0 | 29.5 | 29.5 | 30.3 |
| SrO | 0 | 0 | 0 | 4.5 | 15.0 | 10.0 | 0 | 1.0 | 0 |
| BaO | 0 | 0 | 0 | 0 | 0 | 0 | 0 | 0 | 0 |
| ZnO | 8.0 | 12.0 | 8.0 | 8.0 | 8.0 | 8.0 | 8.0 | 8.0 | 9.5 |
| $Al_2O_3$ | 4.9 | 5.0 | 5.0 | 5.0 | 5.0 | 5.0 | 5.0 | 5.0 | 5.0 |
| $La_2O_3$ | 0 | 0 | 0 | 0 | 0 | 0 | 1.0 | 0 | 0 |
| $B_2O_3$ | 0 | 0 | 2.0 | 0 | 0 | 0 | 0 | 0 | 0 |
| Tg | 712 | 692 | 691 | 710 | 707 | 712 | 719 | 713 | 710 |
| Ts | 836 | 812 | 808 | 837 | 833 | 832 | 838 | 834 | 825 |
| Tc | 958 | 951 | 944 | 954 | 997 | 973 | 966 | 948 | 885 |
| Tc − Ts | 122 | 139 | 136 | 117 | 164 | 141 | 128 | 114 | 60 |
| α | 98 | 88 | 103 | 98 | 91 | 95* | 100* | 98* | 98* |
| Flexion degree | 0 | 0 | 0 | 0 | 0 | 0* | 0* | 0* | 0* |
| Differential peak | 0.003 | 0.005 | 0.004 | 0.002 | 0.002 | 0.003* | 0.005* | 0.003* | 0.003* |
| Fluidity | ○ | 100 | ○ | ○ | 95 | 100 | 100 | 95 | 100 |

TABLE 3

| | Examples | | | | | | | | |
|---|---|---|---|---|---|---|---|---|---|
| | 19 | 20 | 21 | 22 | 23 | 24 | 25 | 26 | 27 |
| $SiO_2$ | 40.5 | 40.5 | 40.5 | 39.4 | 40.5 | 39.9 | 40.5 | 40.5 | 40.1 |
| MgO | 15.0 | 15.6 | 15.3 | 15.3 | 14.8 | 15.3 | 15.0 | 14.8 | 14.7 |
| CaO | 30.0 | 31.2 | 30.6 | 30.6 | 30.0 | 30.6 | 30.3 | 30.0 | 29.7 |
| SrO | 1.8 | 0.9 | 0.9 | 0 | 0 | 0 | 0 | 0 | 0 |
| BaO | 0 | 0 | 0 | 2.0 | 2.0 | 1.5 | 1.5 | 1.0 | 2.0 |
| ZnO | 7.8 | 6.9 | 7.8 | 7.8 | 7.8 | 7.8 | 7.8 | 7.8 | 7.7 |
| $Al_2O_3$ | 4.9 | 4.9 | 4.9 | 4.9 | 4.9 | 4.9 | 4.9 | 4.9 | 4.8 |
| $La_2O_3$ | 0 | 0 | 0 | 0 | 0 | 0 | 0 | 1.0 | 0 |
| $ZrO_2$ | 0 | 0 | 0 | 0 | 0 | 0 | 0 | 0 | 1.0 |
| Tg | 714 | 717 | 715 | 717 | 712 | 710 | 714 | 720 | 712 |
| Ts | 834 | 832 | 829 | 828 | 828 | 823 | 826 | 835 | 836 |
| Tc | 963 | 962 | 962 | 974 | 978 | 958 | 962 | 976 | 974 |
| Tc − Ts | 129 | 130 | 133 | 147 | 150 | 135 | 137 | 141 | 138 |
| α | 99 | 98 | 96 | 97.9 | 96 | 99.3 | 98 | 100 | 99 |
| Flexion degree | 0 | 0 | 0 | 0 | 0 | 0 | 0 | 0 | 0 |
| Differential peak | 0.010 | 0.007 | 0.005 | 0.001 | 0.003 | 0.001 | 0.003 | 0.000 | 0.007 |
| Fluidity | 95 | 100 | 105 | ○ | ○ | ○ | ○ | ○ | ○ |

TABLE 4

| | Examples | | | | | | | | |
|---|---|---|---|---|---|---|---|---|---|
| | 28 | 29 | 30 | 31 | 32 | 33 | 34 | 35 | 36 |
| $SiO_2$ | 40.5 | 40.5 | 40.5 | 40.0 | 40.5 | 39.0 | 42.0 | 38.0 | 38.2 |
| MgO | 22.4 | 22.2 | 23.4 | 15.0 | 16.0 | 18.0 | 15.0 | 15.0 | 14.7 |
| CaO | 22.4 | 22.3 | 23.5 | 31.0 | 26.0 | 23.0 | 30.0 | 30.0 | 29.0 |
| SrO | 0 | 0 | 0 | 0 | 0 | 0 | 0 | 0 | 0 |
| BaO | 2.0 | 1.0 | 0 | 0 | 4.5 | 5.0 | 0 | 0 | 0 |

TABLE 4-continued

| | Examples | | | | | | | | |
|---|---|---|---|---|---|---|---|---|---|
| | 28 | 29 | 30 | 31 | 32 | 33 | 34 | 35 | 36 |
| ZnO | 7.8 | 8.0 | 7.8 | 10.0 | 8.0 | 10.0 | 8.0 | 8.0 | 7.4 |
| $Al_2O_3$ | 4.9 | 5.0 | 4.9 | 4.0 | 5.0 | 5.0 | 5.0 | 5.0 | 4.7 |
| $La_2O_3$ | 0 | 1.0 | 0 | 0 | 0 | 0 | 0 | 0 | 0 |
| $B_2O_3$ | 0 | 0 | 0 | 0 | 0 | 0 | 0 | 4.0 | 6.0 |
| Tg | 706 | 716 | 706 | 708 | 708 | 708 | 712 | 679 | 661 |
| Ts | 828 | 829 | 825 | 825 | 835 | 831 | 831 | 795 | 784 |
| Tc | 975 | 964 | 950 | 905 | 995 | 954 | 954 | 928 | 900 |
| Tc − Ts | 146 | 135 | 135 | 81 | 160 | 123 | 123 | 133 | 116 |
| α | 102 | 100 | 103 | 99 | 98 | 101 | 91 | 105 | 93 |
| Flexion degree | 0 | 0 | 0 | 0 | 100 | 200 | 250 | 300 | 600 |
| Differential peak | 0.005 | 0.002 | 0.002 | 0.001 | 0.014 | 0.021 | 0.024 | 0.03 | 0.06 |
| Fluidity | ◯ | ◯ | ◯ | X | ◯ | 110 | 95 | ◯ | ◯ |

TABLE 5

| | Examples | | | | | | | |
|---|---|---|---|---|---|---|---|---|
| | 37 | 38 | 39 | 40 | 41 | 42 | 43 | 44 |
| $SiO_2$ | 40.5 | 40.5 | 40.0 | 45.0 | 43.2 | 40.0 | 42.0 | 42.2 |
| MgO | 16.5 | 16.0 | 0 | 0 | 0 | 0 | 0 | 0 |
| CaO | 15.0 | 26.0 | 0 | 20.0 | 19.2 | 0 | 26.0 | 19.2 |
| SrO | 15.0 | 0 | 27.5 | 20.0 | 19.2 | 27.5 | 0 | 18.5 |
| BaO | 0 | 0 | 0 | 0 | 0 | 0 | 0 | 0 |
| ZnO | 8.0 | 8.0 | 27.5 | 10.0 | 9.6 | 27.5 | 26.0 | 13.2 |
| $Al_2O_3$ | 5.0 | 5.0 | 5.0 | 3.0 | 2.9 | 3.0 | 2.0 | 0 |
| $La_2O_3$ | 0 | 4.5 | 0 | 0 | 0 | 0 | 0 | 2.9 |
| $TiO_2$ | 0 | 0 | 0 | 0 | 4.0 | 0 | 0 | 2.0 |
| $B_2O_3$ | 0 | 0 | 0 | 2.0 | 1.9 | 2.0 | 4.0 | 1.9 |
| Tg | 718 | 732 | 693 | 688 | 692 | 663 | 636 | 690 |
| Ts | 832 | 856 | 804 | 815 | 813 | 784 | 753 | 804 |
| Tc | 926 | 967 | 827 | 961 | 933 | 856 | 922 | 922 |
| Tc − Ts | 94 | 111 | 23 | 146 | 120 | 72 | 168 | 117 |
| α | — | — | — | 103 | 98 | 59 | 78 | — |
| Flexion degree | — | — | — | 250 | 300 | — | 400 | — |
| Differential peak | — | — | — | 0.023 | 0.032 | — | 0.042 | — |
| Fluidity | X | X | X | ◯ | X | X | ◯ | X |

INDUSTRIAL APPLICABILITY

The present invention can be used for producing SOFC.

The entire disclosures of Japanese Patent Application No. 2007-201104 filed on Aug. 1, 2007 and Japanese Patent Application No. 2008-41255 filed on Feb. 22, 2008 including specifications, claims and summaries are incorporated herein by reference in their entireties.

What is claimed is:

1. Non-lead glass comprising, as represented by mol % based on the following oxides, from 38 to 41.5% of $SiO_2$, from 13 to 17% of MgO, 28 to 33% of CaO, from 0 to 2% of SrO, from 0 to 2.2% of BaO, from 5 to 12% of ZnO and from 4.5 to 7% of $Al_2O_3$, wherein the total content of these components is at least 97%, and when SrO and BaO are contained, the total content of SrO and BaO is at most 2%; wherein the molar ratio of CaO to MgO is from 1.8 to 2.2.

2. The non-lead glass according to claim 1, wherein BaO is from 0.8 to 1.2%, and from 0.8 to 1.2% of $La_2O_3$ is contained.

3. The non-lead glass according to claim 1, wherein $SiO_2$ is at most 41.2%.

4. The non-lead glass according to claim 1, wherein an alkali metal oxide is not contained, or an alkali metal oxide is contained in the total amount of at most 1%.

5. The non-lead glass according to claim 1, which has a softening point of higher than 800° C.

6. The non-lead glass according to claim 1, wherein when its powder is fired at 950° C., a fired product obtained has an average linear expansion coefficient of from $90 \times 10^{-7}$ to $110 \times 10^{-7}$/° C. at from 50 to 1,000° C.

7. The non-lead glass according to claim 1, wherein when its powder is fired at from 900 to 1,100° C., CaO—MgO—$SiO_2$ crystal precipitates in a fired product obtained.

8. Sealing glass made of the non-lead glass as defined in claim 1, which has a sealing temperature of at least 900° C.

9. A glass paste, which contains a powder of the non-lead glass as defined in claim 1.

10. A green sheet, which contains a powder of the non-lead glass as defined in claim 1.

11. A process for producing a solid oxide fuel cell, which comprises a step of sealing members made of a ceramics or metal each other by means of a powder of the non-lead glass as defined in claim 1.

12. A solid oxide fuel cell having at least one sealed part at which members made of a ceramics or metal are sealed each other, wherein at least one sealed part is sealed with a fired product formed by firing the non-lead glass as defined in claim 1.

* * * * *